United States Patent
Kim et al.

(10) Patent No.: US 9,201,675 B2
(45) Date of Patent: Dec. 1, 2015

(54) DAAS MANAGER AND DAAS CLIENT FOR DAAS SYSTEM

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong (KR); Hak-Jae Kim, Daejeon (KR); Seong-Woon Kim, Gyeryong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 205 days.

(21) Appl. No.: 13/964,494

(22) Filed: Aug. 12, 2013

(65) Prior Publication Data

US 2014/0067917 A1 Mar. 6, 2014

(30) Foreign Application Priority Data

Aug. 30, 2012 (KR) .................... 10-2012-0095570

(51) Int. Cl.
*G06F 15/16* (2006.01)
*G06F 9/455* (2006.01)

(52) U.S. Cl.
CPC ........ *G06F 9/45533* (2013.01); *G06F 9/45558* (2013.01); *G06F 2009/4557* (2013.01)

(58) Field of Classification Search
USPC ................................. 709/203, 223, 227, 230
See application file for complete search history.

(56) References Cited

U.S. PATENT DOCUMENTS

| 7,577,722 | B1 | 8/2009 | Khandekar et al. | |
|---|---|---|---|---|
| 2002/0154685 | A1* | 10/2002 | Olafsson | 375/222 |
| 2004/0096044 | A1* | 5/2004 | Olafsson et al. | 379/93.32 |
| 2009/0006801 | A1 | 1/2009 | Shultz et al. | |
| 2009/0260008 | A1 | 10/2009 | Cho et al. | |
| 2010/0325191 | A1 | 12/2010 | Jung et al. | |
| 2011/0153716 | A1* | 6/2011 | Malakapalli et al. | 709/203 |
| 2011/0153838 | A1* | 6/2011 | Belkine et al. | 709/227 |
| 2011/0231899 | A1* | 9/2011 | Pulier et al. | 726/1 |
| 2014/0067917 | A1* | 3/2014 | Kim et al. | 709/203 |
| 2014/0280961 | A1* | 9/2014 | Martinez et al. | 709/226 |

FOREIGN PATENT DOCUMENTS

| KR | 10-2009-0065127 | 6/2009 |
|---|---|---|
| KR | 10-2009-0108868 | 10/2009 |
| KR | 10-2009-0122936 | 12/2009 |
| KR | 10-2010-0138689 | 12/2010 |

* cited by examiner

*Primary Examiner* — Michael Y Won
(74) *Attorney, Agent, or Firm* — Staas & Halsey LLP

(57) ABSTRACT

Disclosed herein are a Desktop As A Service (DaaS) manager and DaaS client for a DaaS system. The DaaS manager includes a connection broker module, a provisioning module, a management module, and a web server module. The connection broker module permits connections to a DaaS client and a DaaS server to a user who has performed user authentication. The provisioning module determines the operating status of the DaaS server, and assigns a virtual machine of an optimum DaaS server to the DaaS client. The management module monitors the operating status of the DaaS server and the virtual machine, and executes a control command of the DaaS server. The web server module provides a web-based management tool Graphic User Interface (GUI) to the user.

8 Claims, 4 Drawing Sheets

DAAS MANAGER AND DAAS CLIENT FOR DAAS SYSTEM

CROSS REFERENCE TO RELATED APPLICATION

This application claims the benefit of Korean Patent Application No. 10-2012-0095570, filed on Aug. 30, 2012, which is hereby incorporated by reference in its entirety into this application.

BACKGROUND OF THE INVENTION

1. Technical Field

The present invention relates generally to a Desktop As A Service (DaaS) manager and DaaS client for a DaaS system and, more particularly, to technology that provides a desktop virtualization environment to a remote user in a server virtualization environment and manages a DaaS system.

2. Description of the Related Art

There is conventional technology related to the Citrix Delivery Center. The Citrix Delivery Center includes an object-oriented delivery controller that manages and controls application and desktop delivery for a user and server workload delivery for virtual and actual servers inside a data center. There are solutions to the management, and service is provided using xenDesktop, XenApp, XenServer, and Netscaler. VMware also utilizes a method that performs application to service and management using the vCenter Product Family, which is an integrated software suite for the management of a virtualization system.

Virt-Manager is open software that also utilizes a method of installing a plurality of programs for the application and management of a virtualization system and running them when necessary and that lacks service functions, and is limited in functionality.

Since these methods are implemented by adding a method for service to each existing product, environments for an administrator and a user are complicated in terms of actual service and a solution for service suitable for each system is provided.

Korean Patent Application Publication NO. 2009-0108868 discloses virtual machine management system-related technology that assigns a processor to a plurality of virtual machines. This technology disclosed in the Korean patent application publication is limited in application to a method of constructing a system that performs virtualization management.

Accordingly, there is an urgent need for new technology that provides a desktop virtualization environment and manages a DaaS system.

SUMMARY OF THE INVENTION

Accordingly, the present invention has been made keeping in mind the above problems occurring in the prior art, and an object of the present invention is to provide a DaaS manager and DaaS client for a DaaS system, which provide functions for the generation, management, extinction and migration of the DaaS system for system configuration in order to manage the DaaS system and to be easily applied to service.

In accordance with an aspect of the present invention, there is provided a DaaS manager, including a connection broker module configured to permit connections to a DaaS client and a DaaS server to a user who has performed user authentication; a provisioning module configured to determine the operating status of the DaaS server, and to assign a virtual machine of an optimum DaaS server to the DaaS client; a management module configured to monitor the operating status of the DaaS server and the virtual machine, and to execute a control command of the DaaS server; and a web server module configured to provide a web-based management tool Graphic User Interface (GUI) to the user.

The connection broker module may permit the assignment of a virtual machine only to a user that has connected through user authentication via virtual machine assignment request information of the user.

The connection broker module provides a desktop virtualization environment connection function and a screen redirection function using a remote connection protocol of the assigned virtual machine after the virtual machine has been assigned; and, in order for the user to connect again at a desired time when the use of the assigned virtual machine is terminated, stores current environment settings based on the user's account, and eliminates the desktop environment connection function and the screen redirection function.

The provisioning module may assign another virtual machine in real time when an abnormality occurs in the assigned virtual machine.

The provisioning module may monitor the resource assignment status and usage information of the DaaS server and the use of generated virtual machines in real time, and may assign an optimum DaaS server.

The provisioning module may separate an image for the operation of the virtual machine and a disk image for the user of the DaaS client, and may assign the DaaS server thereto.

In accordance with an aspect of the present invention, there is provided a DaaS client, including a hypervisor configured to accommodate one or more virtual machines above hardware; a monitoring information collector configured to monitor the virtual machine; a hardware profile collector configured to collect hardware information and Operating System (OS) level information of the DaaS client; and a performance measurer configured to compute the performance information of the virtual machine using information monitored by the monitoring information collector.

The DaaS client may further include a command execution unit configured to buffer and execute a control command transferred from a virtualization server.

In this case, the type of virtual machine may be full virtualization or half virtualization.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
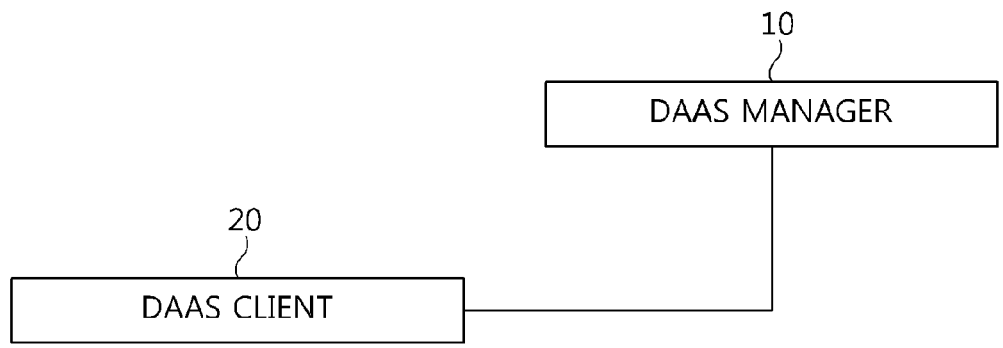
FIG. 1 is a diagram illustrating the configuration of a DaaS system in accordance with an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

Embodiments of the present invention will be described in detail below with reference to the accompanying drawings.

FIG. 1 is a diagram illustrating the configuration of a DaaS system in accordance with an embodiment of the present invention.

Referring to FIG. 1, the DaaS system in accordance with this embodiment of the present invention includes a DaaS manager 10 and a DaaS client 20.

The DaaS manager 10 functions to assign a DaaS server to the DaaS client 20 in response to a request from a user, and to manage the generation, management, extinction and migration of a virtual machine.

The detailed configurations of the DaaS manager 10 and the DaaS client 20 will be described in detail below in conjunction with reference to FIGS. 2 and 3.

Figure 2:
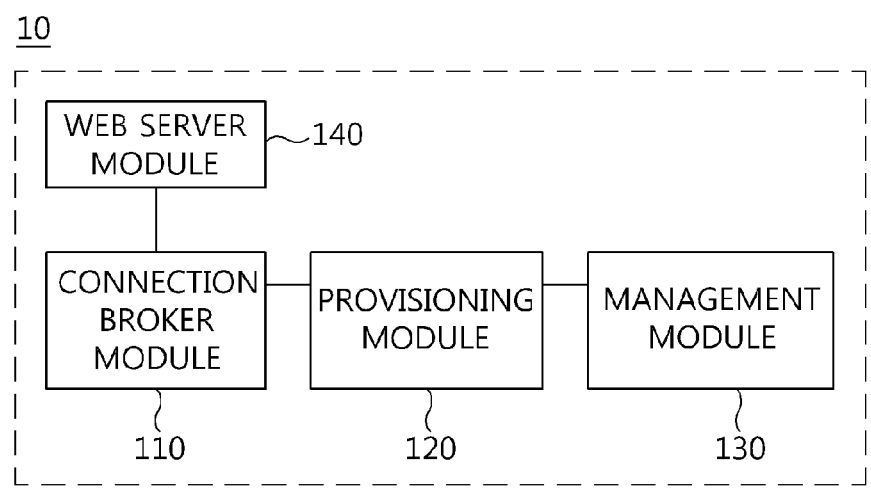
FIG. 2 is a diagram illustrating a DaaS manager in accordance with an embodiment of the present invention.

FIG. 2 is a diagram illustrating the DaaS manager 10 in accordance with an embodiment of the present invention.

Referring to FIG. 2, the DaaS manager 10 in accordance with this embodiment of the present invention includes a connection broker module 110, a provisioning module 120, a management module 130, and a web server module 140.

The connection broker module 110 permits connections to the DaaS client 20 and the DaaS server to a user who has performed user authentication.

In order for the user to remotely receive desktop virtualization service via the DaaS system, he or she connects to the connection broker module 110 that provides a connection to the DaaS server.

In this case, the connection broker module 110 performs the assignment of a virtual machine only to a user who has connected based on user authentication based on the request information of the user and the virtual machine information of the DaaS server that forms part of the current system.

Furthermore, the connection broker module 110 may provide a desktop virtualization environment connection function and a screen redirection function using the remote connection protocol of the assigned virtual machine after the assignment of the DaaS server.

Furthermore, after the user has finished using the assigned virtual machine, the connection broker module 110 may store current environment settings based on a user account so that the user can connect again at a desired time, may eliminate the desktop virtualization connection function, and may eliminate the screen redirection function.

The provisioning module 120 checks the operating status of DaaS servers, and assigns an optimum DaaS server to the DaaS client 20.

In this case, the provisioning module 120 may provide a virtual machine provisioning function for monitoring the resource use and virtual machine assignment of virtualization servers in real time in order to assign a virtual machine capable of supporting optimum desktop virtualization service to a remote user, requesting desktop virtualization service, via the connection broker module 110.

In this case, the provisioning module 120 may monitor the resource assignment status and usage information of DaaS servers of the DaaS system and the use of generated virtual machines in real time.

In this case, the provisioning module 120 may provide an optimum user-customized DaaS server to the remote user, and may assign another virtual machine in real time when a problem occurs in a current virtual machine.

In this case, the provisioning module 120 may separate an image for the operation of the virtual machine and a disk image for a user of the DaaS client 20, and may assign the DaaS server thereto.

The management module 130 monitors the operating status of the DaaS server and the virtual machine, and executes the control commands of the DaaS server.

The web server module 140 provides a web-based management tool GUI to the user.

Figure 3:
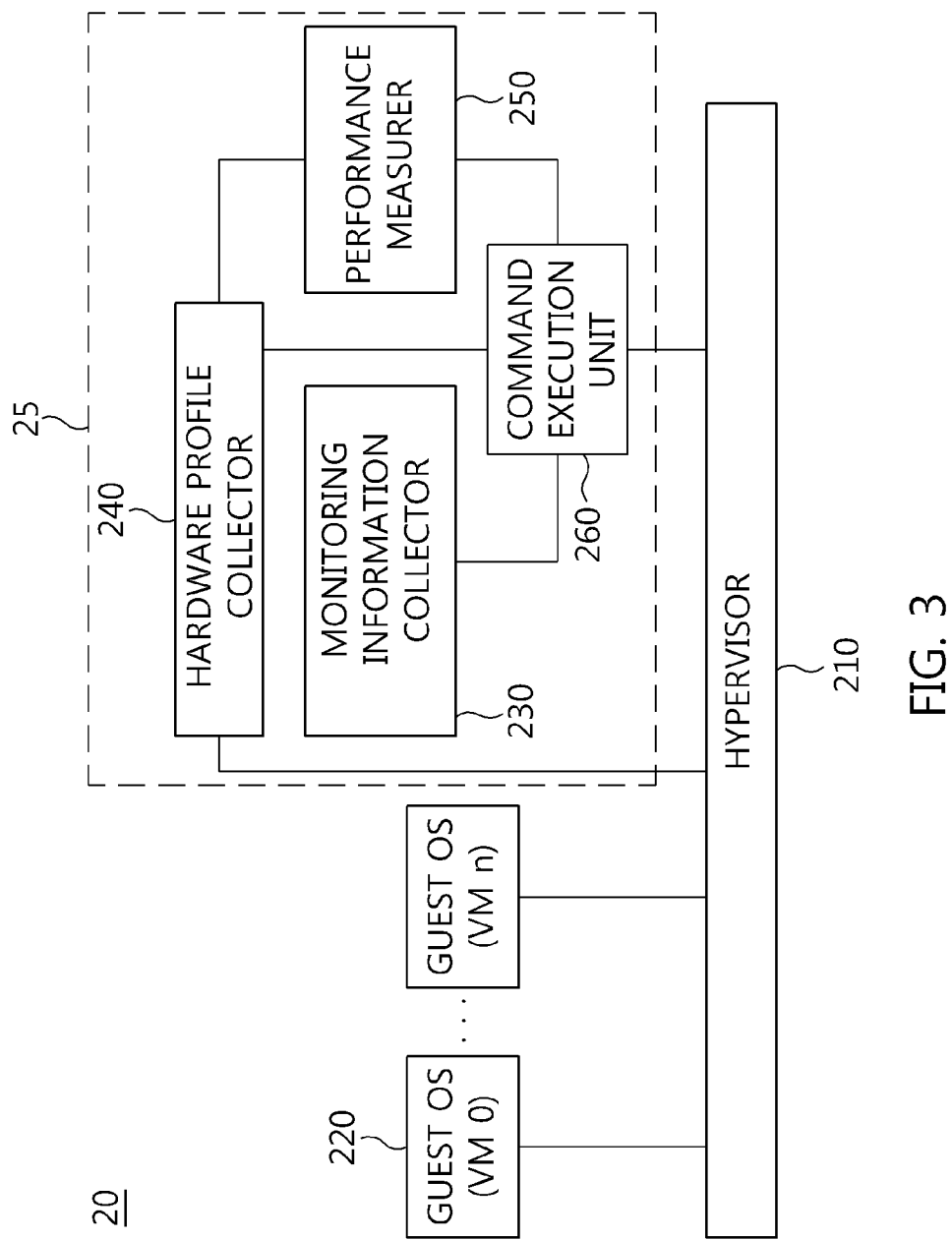
FIG. 3 is a diagram illustrating a DaaS client in accordance with an embodiment of the present invention.

FIG. 3 is a diagram illustrating the DaaS client 20 in accordance with an embodiment of the present invention.

Referring to FIG. 3, the DaaS client 20 in accordance with this embodiment of the present invention includes a hypervisor 210, a monitoring information collector 230, a hardware profile collector 240, a performance measurer 250, and a command execution unit 260.

In this case, the monitoring information collector 230, the hardware profile collector 240, the performance measurer 250, and the command execution unit 260 may be configured as a desktop virtualization agent 25.

The hypervisor 210 accommodates one or more virtual machines 220 above hardware.

The hypervisor 210 may communicate with the configurations of the virtual machine 220 and the desktop virtualization agent 25 using a programmed demon.

In this case, the type of virtual machine 220 may be full virtualization or half virtualization.

The monitoring information collector 230 monitors the virtual machine 220.

The hardware profile collector 240 collects the hardware information and Operating System (OS) level information of the DaaS client 20.

The performance measurer 250 computes the performance information of the virtual machine 220 using the information that is monitored by the monitoring information collector 230.

The command execution unit 260 buffers and executes control commands transferred by the virtualization server.

In this case, a control command related to the control of the virtual machine control may be controlled by the programmed demon, and a control command related to the DaaS client 20 may be processed by the hypervisor 210 and at the OS level.

Meanwhile, the virtualization desktop system uses TCP/UDP as a network protocol. Methods of management will now be described with reference to FIGS. 4 and 5.

Figure 4:
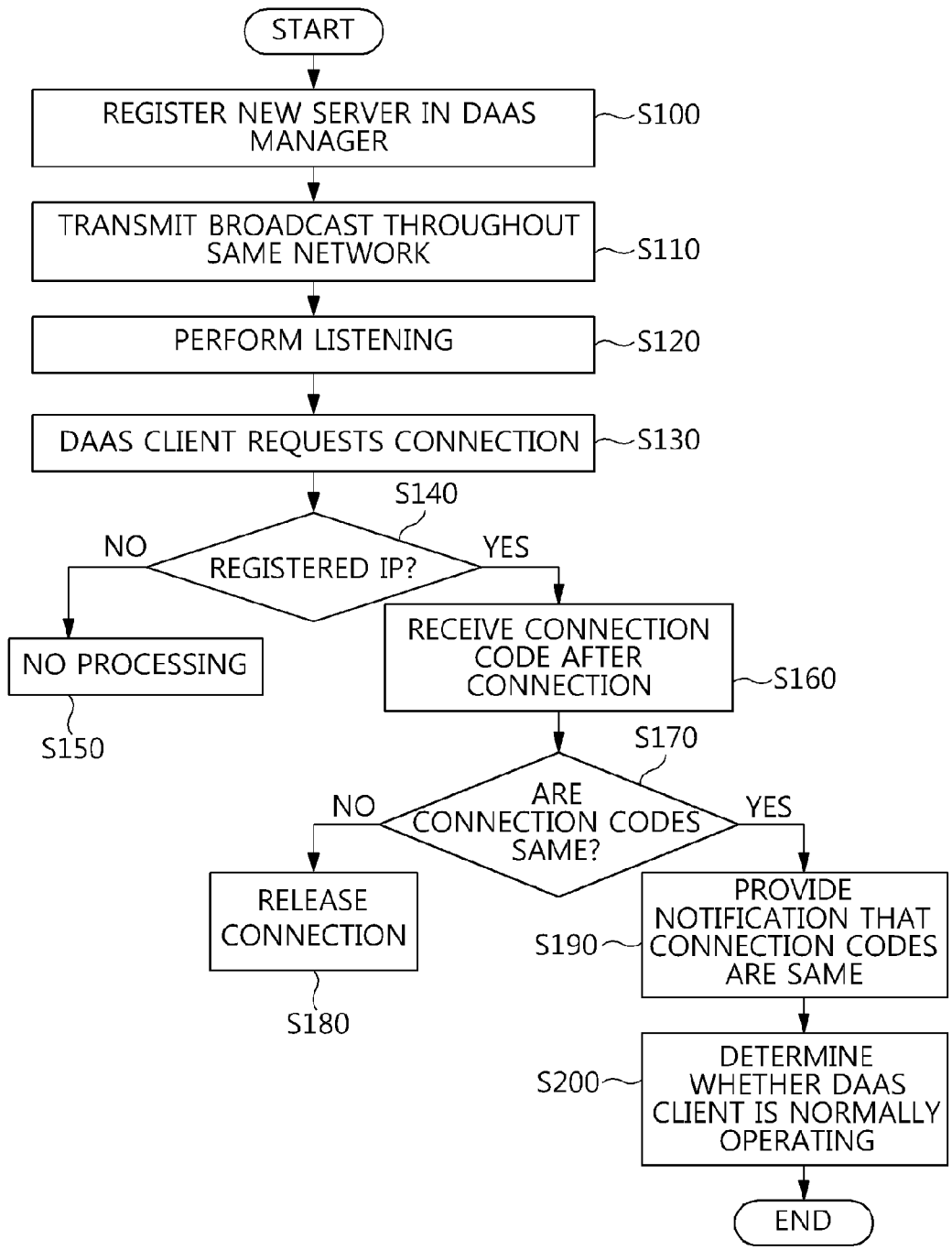
FIG. 4 is a flowchart illustrating a method of management via the DaaS manager in accordance with an embodiment of the present invention.

FIG. 4 is a flowchart illustrating a method of management via the DaaS manager in accordance with an embodiment of the present invention.

Referring to FIG. 4, in the method of management via the DaaS manager in accordance with this embodiment of the present invention, first, a new server is registered in the DaaS manager 10 by a user at step S100.

Meanwhile, a method of registering a new server will now be described. First, the user attempts a connection at the DaaS client 20, and connects to the connection broker module 110 if he or she is a new user. Thereafter, the user is issued with an ID and a password through a membership subscription procedure. The user connects to the DaaS manager 10 using the issued ID, and the DaaS manager 10 generates a new image. In the case of a new image, the DaaS manager 10 may select a preset virtualization image suitable for an existing user pattern, or generates an image via the settings of a CPU, memory and/or a HDD desired by the user. The generated information is held by the connection broker module 110, the connection broker module 110 requests a redirection function from the management module 130 via the image generated for service, and then the management module 130 continuously performs the management thereof.

Thereafter, the DaaS manager 10 transmits the Internet Protocol (IP) address and connection port information of the DaaS manager 10 to all servers that are registered in the same network using a broadcast method at step S110.

In this case, in order to perform transmission without changing the registered client devices when the IP address of the server of the DaaS manager 10 is changed, the IP address and connection port information of the DaaS manager 10 may be transmitted or retransmitted at predetermined cycles when there is no connection of a new server.

Thereafter, the DaaS manager 10 operates as a TCP Server, and performs listening to the broadcast port at step S120.

Thereafter, when a connection request message (TCP Connection) is received from the DaaS client 20 at step S130, it is determined whether the IP address of the corresponding client device is the IP address of a client device registered in the management server at step S140.

If the IP address of the corresponding client device is the IP address of a non-registered client device, a TCP connection is not processed at step S150.

Meanwhile, if the IP address of the corresponding client device is the IP address of a registered client device, a connection code is received from the client device at step S160.

In this case, the connection code may be configured so that it can be modified via the GUI of the DaaS manager.

Thereafter, the connection code is compared with a connection code transmitted from the DaaS client 20 and information about whether they are the same is transmitted to the client device that attempts the connection at step S170

In this case, the results of the comparison may be transmitted as 1 if they are the same, and 0 if they are not the same.

Meanwhile, if the connection codes are not the same, the result that they are not the same is transmitted and then the corresponding connection is released at step S180.

In contrast, if the connection codes are the same, the result that the connection codes are the same is transmitted at step S190, and whether the desktop virtualization agent of the DaaS client is normally operating is determined at step S200.

In this case, whether the connection of the desktop virtualization agent is maintained may be determined via a separate thread or process.

In this case, a configuration may be adopted such that the connection can be maintained using the keepalive function of TCP even when there is no transmission of data.

Figure 5:
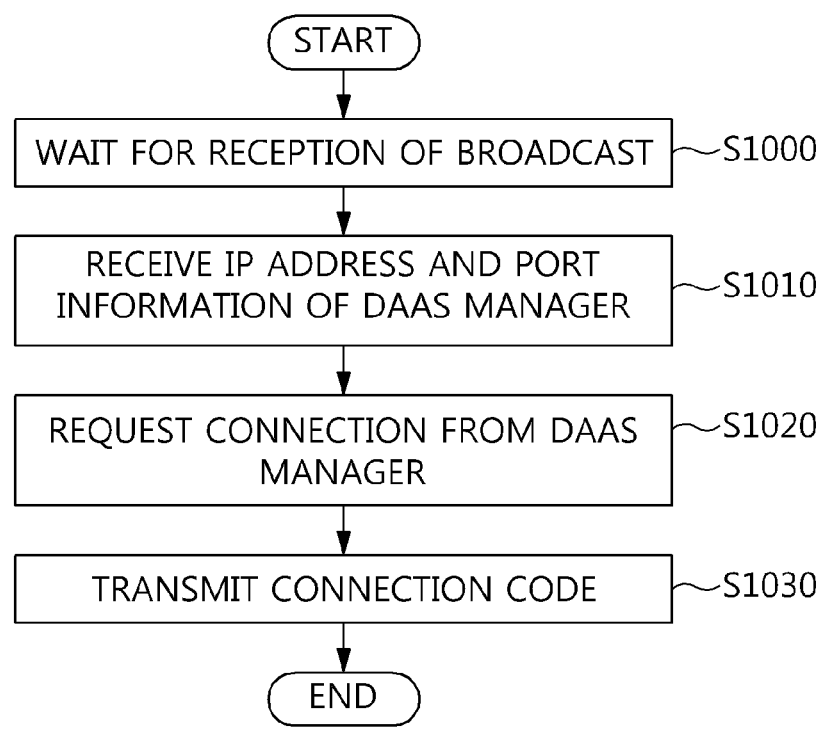
FIG. 5 is a flowchart illustrating a method of management via the DaaS client in accordance with an embodiment of the present invention.

FIG. 5 is a flowchart illustrating a method of management via the DaaS client in accordance with an embodiment of the present invention.

Referring to FIG. 5, in the method of management via the DaaS client in accordance with this embodiment of the present invention, first, in order to connect to the DaaS manager 10, the desktop virtualization agent waits for an IP address and port information transmitted from the DaaS manager 10 during its first running at step S1000.

In this case, a configuration may be adopted such that a broadcast receiver code is first executed when the desktop virtualization agent runs, and the broadcast receiver code is executed again when a TCP connection is released during the running of the desktop virtualization agent after the TCP has been established.

Thereafter, the IP address and port information of the DaaS manager 10 are received via broadcast transmission at step S1010, and a connection is requested from the DaaS manager 10 using the received IP address and port information at step S1020.

Thereafter, after the connection has been established, a connection code is transmitted to the DaaS manager 10 at step S1030.

In this case, the connection code may be stored in the form of a separate file.

Thereafter, the results of the processing of the connection code are waited for. In the case of a connection error, the connection is released, and thus the broadcast receiver code is executed again.

In accordance with the present invention, the DaaS system including the DaaS manager and the DaaS client is applied, so that efficient management can be achieved using a multi-Persona Computer (PC) system based on desktop virtualization, application to systems is easy, and also application to an existing virtualization system is possible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Desktop As A Service (DaaS) manager, comprising:
   a connection broker module configured to permit connections to a DaaS client and a DaaS server to a user who has performed user authentication;
   a provisioning module configured to determine an operating status of the DaaS server, and to assign a virtual machine of an optimum DaaS server to the DaaS client;
   a management module configured to monitor an operating status of the DaaS server and the virtual machine, and to execute a control command of the DaaS server; and
   a web server module configured to provide a web-based management tool Graphic User Interface (GUI) to the user,
   wherein the connection broker module:
   provides a desktop virtualization environment connection function and a screen redirection function using a remote connection protocol of the assigned virtual machine after the virtual machine has been assigned; and
   in order for the user to connect again at a desired time when use of the assigned virtual machine is terminated, stores current environment settings based on the user's account, and eliminates the desktop environment connection function and the screen redirection function,
   wherein the provisioning module separates an image for operation of the virtual machine and a disk image for a user of the DaaS client, and assigns the DaaS server thereto.

2. The DaaS manager of claim 1, wherein the connection broker module permits assignment of a virtual machine only to a user that has connected through user authentication via virtual machine assignment request information of the user.

3. The DaaS manager of claim 1, wherein the provisioning module assigns another virtual machine in real time when an abnormality occurs in the assigned virtual machine.

4. The DaaS manager of claim 1, wherein the provisioning module monitors resource assignment status and usage information of the DaaS server and use of generated virtual machines in real time, and assigns an optimum DaaS server.

5. A Desktop As A Service (DaaS) client, comprising:
   a hypervisor configured to accommodate one or more virtual machines above hardware; and a desktop virtualization agent comprising:
  a monitoring information collector configured to monitor the one or more virtual machines;
  a hardware profile collector configured to collect hardware information and Operating System (OS) level information of the DaaS client; and
  a performance measurer configured to compute performance information of the one or more virtual machines using information monitored by the monitoring information collector,
  wherein the desktop virtualization agent receives an internet protocol (IP) address and port information of a DaaS manager, requests a connection with the DaaS manager using the IP address and port information of the DaaS manager, and when the connection with the DaaS manager is established, transmits a connection code to the DaaS manager for comparison with a connection code transmitted from a client device to the DaaS manager to determine whether or not the connection of the DaaS client with the DaaS manager should be maintained,
  wherein an image for operation of at least one of the virtual machines and a disk image for a user of the DaaS client are separated, and the DaaS client is assigned to a virtualization server, via the DaaS manager.

6. The DaaS client of claim 5, wherein the desktop virtualization agent further comprises a command execution unit configured to buffer and execute a control command transferred from the virtualization server.

7. The DaaS client of claim 6, wherein the hypervisor communicates with the one or more virtual machines and the desktop virtualization agent using a programmed daemon.

8. The DaaS client of claim 7, wherein a control command transferred from the virtualization server which relates to control of a virtual machine control among the one or more virtual machines is controlled by the programmed daemon, and a control command related to the DaaS client is processed by the hypervisor and at the OS level.

* * * * *